United States Patent [19]

Lashinger

[11] Patent Number: 5,660,002
[45] Date of Patent: Aug. 26, 1997

[54] GREENHOUSE APPARATUS AND METHOD

[76] Inventor: Albert R. Lashinger, 140 Duncan Trail, Longwood, Fla. 32779

[21] Appl. No.: 508,444

[22] Filed: Jul. 28, 1995

[51] Int. Cl.$^6$ .................................................. E04H 15/30
[52] U.S. Cl. .................... 52/63; 52/222; 52/273; 52/126.1; 135/119; 135/124; 135/120.1; 135/120.2; 135/120.3; 135/909; 135/151; 135/152; 248/188.2; 49/17 R
[58] Field of Search .......................... 52/63, 222, 273, 52/126.1, 274, 275, 36.4; 135/119, 124, 115, 91, 92, 93, 152, 157, 120.2, 120.3, 120.1, 909; 47/17 R; 211/173, 174, 175, 184; 49/381, 382; 16/19; 248/188.2

[56] References Cited

U.S. PATENT DOCUMENTS

| | | | |
|---|---|---|---|
| 1,846,011 | 2/1932 | Adams | 135/151 X |
| 2,950,727 | 8/1960 | Dunn | 52/63 X |
| 3,441,037 | 4/1969 | Transeav | 135/120.3 X |
| 3,453,786 | 7/1969 | Rebarchek | 52/63 X |
| 3,561,518 | 2/1971 | Johnson | 52/63 X |
| 3,739,536 | 6/1973 | Ward | 52/63 |
| 3,751,865 | 8/1973 | Brigham | 52/92 |
| 3,812,616 | 5/1974 | Koziol | 47/17 |
| 4,051,626 | 10/1977 | Trumley et al. | 47/17 |
| 4,057,941 | 11/1977 | Schwartz | 52/63 |
| 4,076,431 | 2/1978 | Burvall | 403/171 |
| 4,077,158 | 3/1978 | England | 47/17 R X |
| 4,084,598 | 4/1978 | Rainwater | 135/909 X |
| 4,091,584 | 5/1978 | Brown | 52/86 |
| 4,285,354 | 8/1981 | Beavers | 135/909 X |
| 4,456,212 | 6/1984 | Raftery | 248/188.2 X |
| 4,601,137 | 7/1986 | Bates | 52/63 |
| 4,622,950 | 11/1986 | Greenbaum | 52/63 X |
| 4,769,962 | 9/1988 | Pohl et al. | 52/63 X |
| 4,770,088 | 9/1988 | Kistner | 135/909 X |
| 4,841,688 | 6/1989 | Rinaldi | 52/63 |
| 5,148,646 | 9/1992 | Lutostanski | 52/63 X |
| 5,216,834 | 6/1993 | Crowley | 47/17 |
| 5,414,950 | 5/1995 | Johnson, Jr. | 135/119 X |
| 5,415,915 | 5/1995 | Oh | 135/119 X |
| 5,479,744 | 1/1996 | Meyer | 52/63 |
| 5,555,681 | 9/1996 | Cawthon | 52/63 |

FOREIGN PATENT DOCUMENTS

| | | | |
|---|---|---|---|
| 3127110 | 2/1983 | Germany | 135/909 |

*Primary Examiner*—Wynn E. Wood
*Assistant Examiner*—W. Glenn Edwards
*Attorney, Agent, or Firm*—William M. Hobby, III

[57] ABSTRACT

An easily assembled greenhouse apparatus includes a polymer tube frame formed with plastic tube frame members, some of which have a plurality of openings therein, which tubes are connected together with conventional plastic tube couplings. Each of a plurality of cover attaching members has a screen gripping portion and a tube attaching member for attaching to the polymer tube frame. A plastic covering extends over the polymer tube frame and is attached thereto with the plurality of cover attaching members attaching through the plastic covering and into one of the polymer tubing frame member openings. A door is formed with polymer tube frame members and has a polymer covering and a pair of hinge pins. A method of assembling a greenhouse includes selecting the polymer tubing frame in accordance with the apparatus and rotatably attaching a door formed with polymer tube frame members with a pair of hinge pins, and then selecting a plurality of cover attaching members and attaching a plastic covering extending over the polymer tube frame with the plurality of cover attaching members.

11 Claims, 2 Drawing Sheets

5,660,002

GREENHOUSE APPARATUS AND METHOD

BACKGROUND OF THE INVENTION

The present invention relates to an easily assembled greenhouse and to a method of assembling a greenhouse, especially to a greenhouse formed of a polymer tube frame having a polymer tube frame door.

Greenhouses are used to provide a sheltered controlled environment for plant growth and should foster plant life within it by giving shelter and by controlling the reception of solar radiation and by providing control ventilation and by reducing nocturnal re-radiation. A greenhouse for home use should be relatively inexpensive and easily assembled and with sufficient portability. In practice, these characteristics have been difficult to achieve in greenhouse structures. Various forms of small greenhouse-like structures are presently available for use at home. These structures are used to facilitate the growing of plants and for seed germination prior to planting an outdoor garden. In addition, due to the weather in many geographical areas, people unable to raise out-of-door many of the tropical or more exotic type plants. These plants require relatively high moisture content in the atmosphere and soil as well as a relatively warm temperature.

Prior art greenhouses may be seen in the Brown patent, U.S. Pat. No. 4,091,584, for a small building structure. In the Brown patent a skeletal building frame is configured which can be assembled and disassembled to produce a module fabricated from polyvinyl tubing which includes a rectangular base connected at the corners and which has a ridge pole supported by vertical members to the base members. A plurality of arcuate ribs are formed by passing straight tubes through lateral openings in the ridge pole and bending the ends of the tubes downward for insertion into vertical openings in the side members of the base. The frame is then covered with a translucent plastic film or fiberglass panels. The Koziol patent, U.S. Pat. No. 3,812,616, is for a portable greenhouse having a support structure including a plurality of covered sides which can be rolled up. The Schwartz patent, U.S. Pat. No. 4,057,941, is a modular greenhouse construction in which prefabricated panels are interlocked to form walls and a roof. The Greenbaum patent, U.S. Pat. No. 4,622,950, for Solamar II is a shelter for the growth of plants which is comprised of panels. The Trumley et al. patent, U.S. Pat. No. 4,051,626, is a portable self-contained greenhouse having a base pan having longitudinally extending troughs in a transparent enclosure having wall and roof panels supported on the base pan. The Crowley patent, U.S. Pat. No. 5,216,834, is a solar structure or greenhouse having a framework formed with frame members and a flexible cover. The Brigham patent, U.S. Pat. No. 3,751,865, is a modular building construction fabricated of a plurality of individual panel sections. The Burvall patent, U.S. Pat. No. 4,076,431, is a connecting element for movably joining together frame members.

In contrast to these prior patents, the present invention allows for the easy assembly of a greenhouse structure from conventional polymer or PVC tube frame members assembled with conventional PVC couplings but which also includes a lightweight hinged door along with special attaching members for attaching the cover to the framework.

SUMMARY OF THE INVENTION

An easily assembled greenhouse apparatus includes a polymer tube frame formed with plastic tube frame members, some of which have a plurality of openings therein, which tubes are connected together with conventional plastic tube couplings. Each of a plurality of cover attaching members has a screen gripping portion and a tube attaching member for attaching to the polymer tube frame. A plastic covering extends over the polymer tube frame and is attached thereto with the plurality of cover attaching members attaching through the plastic covering and into one of the polymer tubing frame member openings. A door is formed with polymer tube frame members and has a polymer covering and a pair of hinge pins. The door is rotatably attached to the polymer tubing frame with the hinge pins, with each hinge pin extending through one polymer tube frame member and one door frame member. The cover attaching members may have a molded plastic fastener with an arcuate shape and includes a protruding frame attaching extension. A method of assembling a greenhouse includes selecting the polymer tubing frame in accordance with the apparatus and rotatably attaching a door formed with polymer tube frame members with a pair of hinge pins, each hinge pin extending through one polymer tube frame member and one door frame member and then selecting a plurality of cover attaching members and attaching a plastic covering extending over the polymer tube frame with the plurality of cover attaching members. Each cover attaching member is attached through the screen into an opening in one frame member to clamp the clamping portion thereof onto the screen and frame member.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
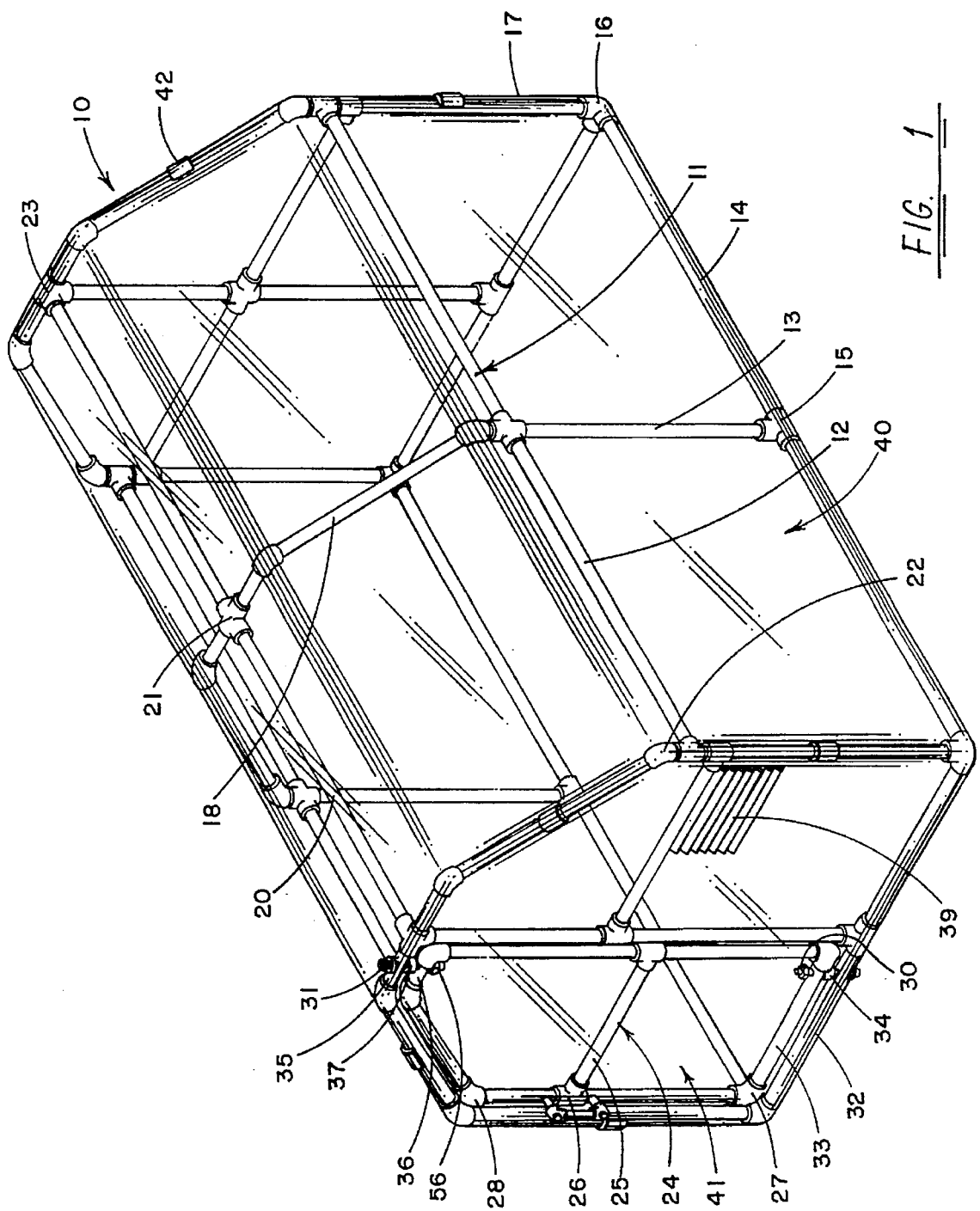
FIG. 1 is a perspective view of a greenhouse in accordance with the present invention.

Referring to the drawings and especially to FIG. 1, an easily assembly greenhouse 10 is illustrated having a plurality of polymer frame members 11 which may be a polymer tube frame member, such as PVC pipe. Frame 11 may include the plastic tube frame members 12 running horizontally and connecting to vertically extending frame members 13 which are connected to horizontal base frame members 14 with T-connectors 15. Corner coupling 16 can be used to connect the corner frame members 17, each corner also includes alignment means for aligning the frame when placed in position on the earth. The greenhouse frame 11 also includes angled top frame members 18 and a center structural frame member 20. The frame also includes four way coupling joints 21 as well as 45° couplings 22 and a multi-way coupler 23 for coupling the center top frame member 20 to the frame at each end.

The front of the greenhouse 10 has a door 24 formed of polymer tube members 25 having T-couplers 26 as well as corner coupling elbows 27 and 45° couplings 28. The door has a hinge pin 30 at the bottom thereof and a hinge pin 31 at the top thereof. Hinge pin 30 passes through a bottom frame member 32 and through the bottom door frame member 33 and has a door spacing member 34. The top hinge pin 31 passes through a top frame member 35 and through a top door frame member 36 and has a spacing member 37 so that the door can be quickly hinged to the frame 11.

The entire framework 11 has a thin plastic film or sheeting 40 extending thereover which is also extended over the front and rear of the greenhouse. Similarly, plastic sheeting 41 extends over the door frame 24. The sheeting, as illustrated, is supported in place with a plurality of cover attaching members 42 attached on different positions of the frame 11. A vent 39 is located in the plastic film 40 to allow for the flow of air therethrough. Attaching members 42 are illustrated in FIGS. 2 and 4.

Figure 2:
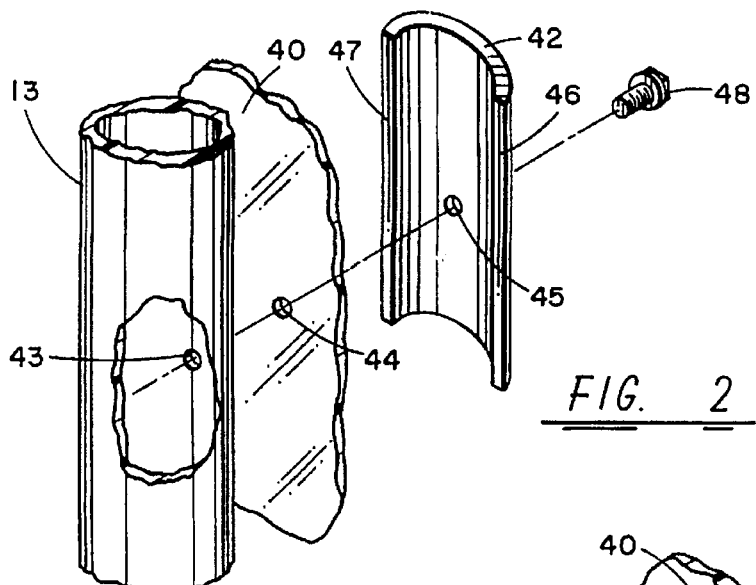
FIG. 2 is an exploded perspective view of the cover attached to the section of frame.

Turning more specifically to FIG. 2, a section of a frame member 13 is illustrated having the polymer covering film 40 thereover. The frame member 13 has an aperture 43 therein while the translucent polymer material 40 has an aperture 44 therein and the attaching member 42 has an aperture 45 therein. Attaching member 42 is arcuate shaped of similar dimensions to the frame member 13 so that when clamped thereon, it will firmly clamp the plastic covering 40 with the edges 46 and 47 which are expanded and clamp thereover with the threaded fastener 48 passing through the aperture 45 in the aperture 44 of the plastic film 40 and into the aperture 43 in the frame 13 where it is locked in place.

Figure 4:
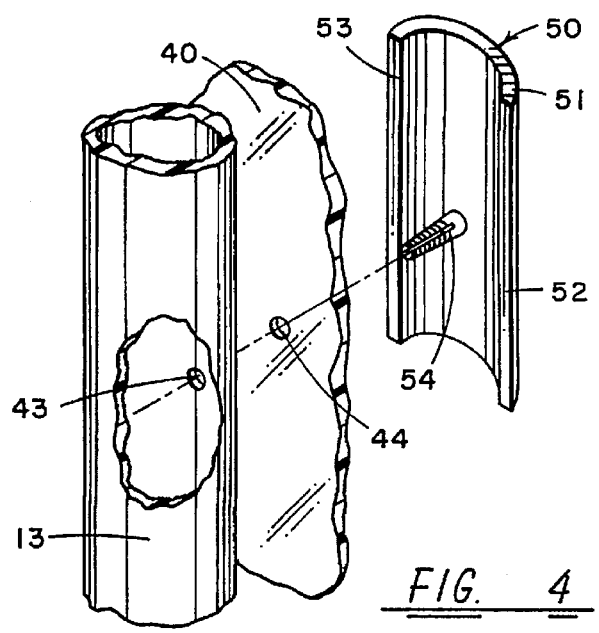
FIG. 4 is an exploded perspective view of another embodiment of a cover attaching member.

FIG. 4 has the same view with the frame member 13 and the aperture 43 therein holding the flexible polymer film 40 thereto having the aperture 44 therein. The attaching member 50 in this case also has an arcuate attaching portion 51 curved on a similar curve to the frame member 13 having the gripping edges 52 and 53 for gripping onto the film 40 against the frame member 13. The attached arm 54 in this case is formed or molded as part of the clamping portion 51 and is attached by merely driving the expandable protruding member 54 through the aperture 44 and into the frame 13 aperture 43.

Figure 3:
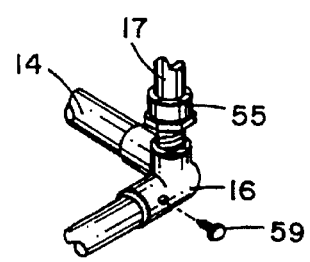
FIG. 3 is a partial perspective of a corner connector having the vertical leveling mechanism.

FIG. 3 shows a corner section having the base frame members 14 with the corner coupling member 16 holding the two base frame members 14 together and has a threaded leveling member 55 threaded into the corner coupling 16. Threading the corner leveling adapter 55 into and out of the coupling 16 allows the corner frame member 17, to be adjusted in height between the frame members. The frame member 17 is supported in the open tube portion of the threaded leveling member 55. FIG. 3 also illustrates how a self-tapping screw 59 can be added to each coupling to removably secure the frame members to the couplings.

Figure 5:
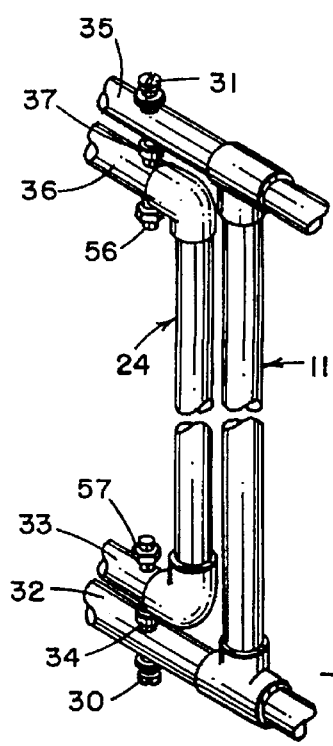
FIG. 5 is a partial perspective view of the hinge door frame hinged to the building frame.

Turning to FIG. 5, a partial perspective shows the connection of the door 24 to the frame 11 with the hinge pin 31 which is illustrated as a bolt member having a spacing member 37 between the upper frame 35 and the door frame member 36. A nut 56 holds the bolt pin 31 in place. The bottom of the door 24 has a hinge pin or bolt 30 extending through the base frame member 32 and through the door frame member 33 and has a spacing member 34 between the frame members and a hinge nut 57 holding the hinge bolt 30 in place to provide a rotatably hinged door frame.

Figure 6:
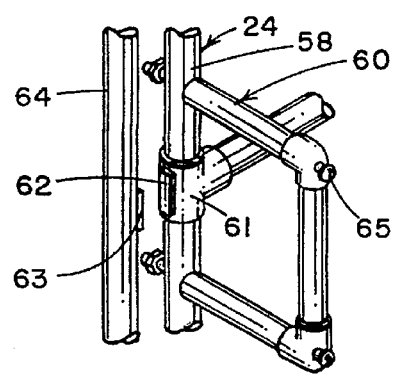
FIG. 6 is a partial perspective view of the door frame having the handle and door latch thereon.

FIG. 6 shows a portion of the door frame 24 having the door frame member 58 having a handle 60 attached thereto which handle is also formed of polymer frame members and is bolted to the door frame member 58. The T-coupling 61 on the door has a magnetic latch 62 attached thereto which is attracted to the ferrous metal plate 63 on the frame member 64 so that the door can be held in a latched position with a magnetic latch and can be opened with the handle 60. The handle 60 has a pair of bolts 65 extending therethrough and through the frame member 58 to provide a strong attachment to the frame member 58 and to the door.

It should be clear at this point that an easily assembled greenhouse apparatus has been provided. This greenhouse may be supplied in kit form by providing the selected frame members of the frame 11 cut to size with the apertures 43 predrilled or punched at predetermined locations throughout the frame members 14. The T-couplings 15 as well as the corner couplings 16, 45° couplings 22, and couplings 23 are all provided with the kit which may be marked with numbers for rapid assembly. The frame is assembled and the door frame 24 is assembled and leveled with the leveling adapter 55 on each corner of the frame 11. The door is attached to the frame with a hinge pin 30 and 31 and the door and frame are covered with a polymer film or the like using the rapid cover attaching members 42 or 50 locked into the apertures placed in the frame members.

The process of assembling the greenhouse includes selecting a polymer tubing frame 11 formed with polymer tube frame members 13, 14, and 20, some of which frame members have a plurality of openings 43 spaced therein and connecting the tube members together with polymer tube connectors or coupling members including elbows, T-connectors, crosses, adapters, and 45° couplings. The selected door is made of polymer tube frame members and has a polymer covering and is rotatably attached to the greenhouse frame 11 with a pair of hinge pins. The process includes selecting a plurality of cover attaching members 42 or 50, each having screen gripping portions and tube attaching portions and then attaching the plastic film covering extending over the polymer tube frame with the cover attaching members to complete the greenhouse. The process steps may also include the adding of the door latching member to the frame and the use of the special cover attaching members. It should, however, be clear that the present invention is not to be considered as limited to the forms shown which are to be considered illustrative rather than restrictive.

I claim:

1. An easily assembled greenhouse comprising:

a polymer tubing frame formed with polymer tube frame members, at least some of said frame members having a plurality of openings therein and said tube members being connected together with polymer tube connector members;

a plurality of cover attaching members, each having a screen gripping portion and a tube attaching member for attaching each cover attaching member to one said polymer tubing frame member;

a plastic covering extending over said polymer tube frame and attached to said polymer tube frame with a plurality of said cover attaching members attaching through said plastic covering and into one polymer tubing frame member opening;

a door formed with polymer tube frame members and having a polymer covering and a pair of hinge pins, said door being rotatable attached to said polymer tubing frame with said pair of hinge pins, each hinge pin extending through one polymer tube frame member and one door frame member; and said polymer tube frame having a plurality of vertically extending polymer tube members, a plurality of said vertically extending tube members each having a frame aligning member therein for adjusting the length of the frame member to said polymer tubing frame including a threaded adapter having a hollow cylindrical portion attached to a vertical frame member; whereby a greenhouse may be easily assembled of a polymer tube frame having a cover attached with cover fasteners.

2. An easily assembled greenhouse in accordance with claim 1 in which said door has a latching member attached to one door frame member.

3. An easily assembled greenhouse in accordance with claim 2 in which said door latching member is a magnetic latch.

4. An easily assembled greenhouse in accordance with claim 2 in which said tube attaching member is a metal screw.

5. An easily assembled greenhouse in accordance with claim 2 in which said tube attaching member is a molded plastic fastener formed on said screen gripping portion of said cover attaching member.

6. A method of assembling a greenhouse comprising:

selecting a polymer tubing frame formed with polymer tube frame members, at least some of said frame members having a plurality of openings therein and said tube members being connected together with polymer tube connector members including selecting a polymer tube frame having a plurality of vertically extending polymer tube members, a plurality of said tube member having a threaded male adaptor attached to a vertical frame member for adjusting the length of the frame member to level said polymer tubing frame;

rotatably attaching a door formed with polymer tube frame members and having a polymer covering to said selected polymer tubing frame with a pair of hinge pins each hinge pin extending through one polymer tube frame member and one door frame member;

selecting a plurality of cover attaching members, each having a screen gripping potion and a tube attaching member for attaching each cover attaching member to a polymer tubing frame member; and attaching a plastic covering extending over said polymer tube frame with a plurality of said cover attaching member attaching through said plastic covering and into one polymer tubing frame member opening, whereby a greenhouse is easily assembled.

7. A method of assembling a greenhouse in accordance with claim 6 including the step of attaching a door latching member to a door frame member.

8. A method of assembling a greenhouse in accordance with claim 6 including the step of attaching a magnetic door latching member.

9. A method of assembling a greenhouse in accordance with claim 8 in which the step of selecting a plurality of cover attaching members, includes selecting each cover attaching member tube attaching member with a metal screw.

10. A method of assembling a greenhouse in accordance with claim 9 in which the step of selecting a plurality of cover attaching members, includes selecting each cover attaching member tube of a molded plastic fastener formed on said screen gripping portion of said cover attaching member.

11. A method of assembling a greenhouse in accordance with claim 6 including the step of adjusting the length of selected vertical frame members to level said polymer tubing frame.

* * * * *